Figure 1:
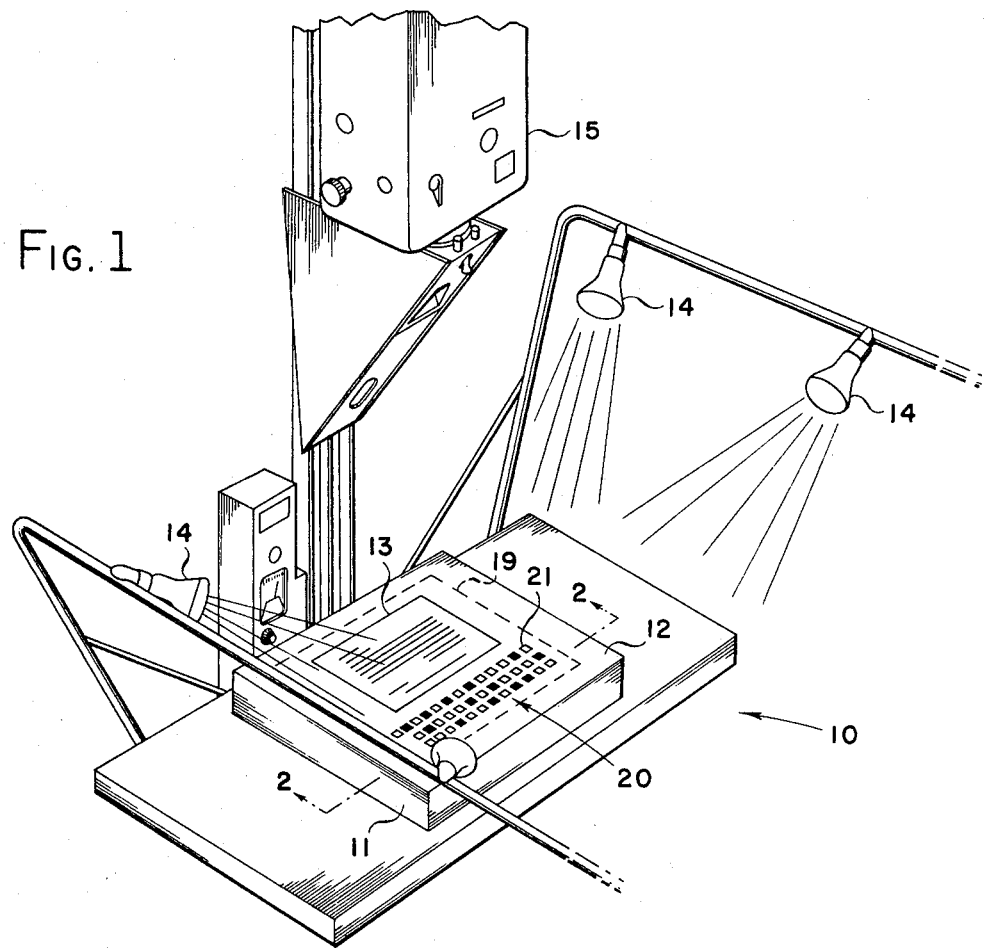

United States Patent [19]
Tucker et al.

[11] 3,710,696
[45] Jan. 16, 1973

[54] APPARATUS FOR PRODUCING OPTICAL PATTERNS

[75] Inventors: John R. Tucker, Alpharetta, Ga.; Raymond R. Williams, Marietta, Ga.

[73] Assignee: Lockheed Aircraft Corporation, Burbank, Calif.

[22] Filed: Feb. 4, 1971

[21] Appl. No.: 112,608

[52] U.S. Cl. ..................................95/1.1, 40/132 D
[51] Int. Cl. .............................................G03b 17/24
[58] Field of Search .95/1.1; 40/132 D, 130 D, 130 E

[56] References Cited

UNITED STATES PATENTS

| | | |
|---|---|---|
| 2,931,027 | 3/1960 | Blefary et al. ..................40/130 E X |
| 3,282,176 | 11/1966 | Morse et al. .............................95/1.1 |
| 3,334,539 | 8/1967 | Kleist et al. ..........................95/1.1 X |

Primary Examiner—Samuel S. Matthews
Assistant Examiner—Kenneth C. Hutchison
Attorney—Roger T. Frost and George C. Sullivan

[57] ABSTRACT

Apparatus for producing optical patterns of digitally encoded information to be photographed along with other information. The patterns of digital data used for frame identification in microfilm photography or for other purposes are provided by means of a coding matrix including a number of lamps individually mounted in recessed chambers beneath a portion of the reflective surface of a front-illuminated supporting member on which the pages of text or other information are received for photographing. The interior of each recessed chamber is nonreflective so that each chamber is photographed as a black area when the corresponding lamp is not illuminated and is photographed as an illuminated area optically indistinguishable from the illuminated background provided by the reflective surface when the lamp is illuminated.

7 Claims, 2 Drawing Figures

PATENTED JAN 16 1973

3,710,696

JOHN R. TUCKER
RAYMOND R. WILLIAMS
INVENTORS.

BY George Sullivan
Agent

Roger T. Frost
Attorney

APPARATUS FOR PRODUCING OPTICAL PATTERNS

This invention relates in general to apparatus for producing optical patterns and in particular to apparatus for producing optical patterns containing digital data to be photographed in conjunction with pictorial or other information.

The ever-increasing need to store and retrieve large quantities of information, such as tables, charts, lists, and the like, which may best be stored as a series of visual image frames on a strip of photographic film has generated the need for rapid identification of each frame of film. Film frame identification is typically accomplished by associating with each frame a unique digital optical pattern which identifies the location or "addredd" of the particular frame and which additionally may contain other digitally encoded information, such as the type of information on the associated pictorial portion of the film frame and the direction of film traverse required to reach a particular location on the film. The digital information on each frame is read by suitable optical apparatus, known to those skilled in the art, as the film is traversed through a viewing apparatus which may be equipped with automatic controls connected to stop the film drive mechanism when a preselected frame of film is appropriately positioned.

While the visual portion of each film frame can be obtained simply by photographing the desired material, applying the proper digital code patterns to each frame can present difficulties. For example, if the visual material to be photographed consists of the conventional black-print-on-white-paper, which is front-lighted and photographed, prior attempts to simultaneously photograph the digital code patterns by positioning and selectively illuminating a pattern of lamps adjacent the visual material have not been satisfactory because the intense illumination required to cause proper photographic reproduction of the visual material tends to wash out the visual difference between the digital encoding lamps that are "on", representing a first digital state, and the lamps which are "off", representing a second digital state. Prior attempts to overcome this problem have involved modifying the camera to enable the digital code illumination to be applied to each frame of film through an optical path or device separate from the camera lens system used to photograph the visual information. While devices such as fiber-optic elements or auxiliary lens systems have been used to transmit the digital data to the film in the camera, such expedients suffer the disadvantage that conventional microfilm-type cameras, which are otherwise usable to photograph the visual information, cannot be used to photograph the combined visual-digital information without being extensively modified with an auxiliary optical system as aforementioned.

Accordingly, it is an object of the present invention to provide improved apparatus for producing optical patterns.

Another object of this invention is to provide improved apparatus for producing optical digital patterns.

Still another object of this invention is to provide apparatus for producing optical digital patterns which can be photographed in conjunction with other graphic information.

Yet another object of the present invention is to provide apparatus for producing optical digital patterns having distinct contrasting digital states resistant to being washed out when the digital pattern is externally illuminated.

Figure 2:
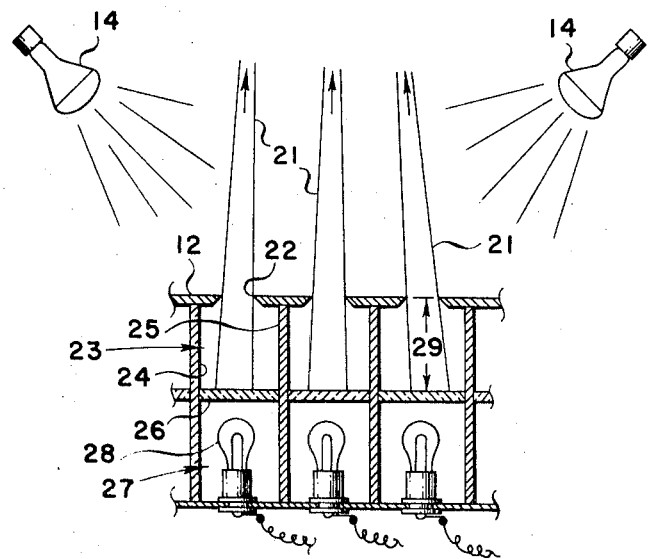

The foregoing objects, as well as other objects and advantages of the present invention, will be apparent from consideration of the following description wherein:

FIG. 1 is a pictorial view of apparatus according to an embodiment of the present invention; and FIG. 2 is an elevation partial section view taken along lines 2—2 of FIG. 1.

Stated generally, each digital element of the digital matrix according to the present invention includes a lamp which provides illumination to a nonreflective chamber recessed beneath an illuminated reflective surface on which the pictorial or other information is disposed to be photographed. An aperture in the reflective surface is positioned to correspond to the position of that digital element in the overall digital matrix.

More specifically, and with reference taken to FIGS. 1 and 2, there is shown photographic apparatus indicated generally at 10 and including a base member 11 having a reflective surface 12 on which the information 13 to be photographed may be placed. One or more sources of illumination 14 are mounted to illuminate the surface 12 and the sheet 13 sufficiently to permit the camera 15 to photograph the sheet.

The camera 15 is selected and positioned to photograph an area on the surface 12 outlined at 19 and including a digital matrix 20 made up of a plurality of individual digital elements 21. The individual digital elements 21 are arranged according to a desired pattern to provide the requisite frame identification and other information in a manner known to those skilled in the art.

Each of the individual elements 21, as shown in FIG. 2, include an aperture 22 in the surface 12 opening into a chamber 23 disposed beneath the surface 12. Each of the chambers 23 is operative to reflect back to the camera 15 little or none of the illumination which enters the aperture 22 from the sources 14, and this is accomplished by rendering the interior of the chamber 23, including the walls 24 and 25, nonreflective by any suitable technique such as by covering the interior of the chamber 23 with a nonreflective black coating or the like.

At the end of the chamber 23 opposite the aperture 22 there is an end wall 26 which is made of a translucent or transparent material such as frosted glass or the like and which separates the chamber 23 from a lamp chamber 27. A source of illumination such as the lamp 28 is positioned to cast illumination in the lamp chamber 27. To enhance the nonreflective quality of each chamber 23, the depth 29 of each chamber should be selected along with the width of the chamber and the width of each aperture 22 so that most if not all of the illumination which enters the aperture 22 from the sources of illumination 14 strikes the nonreflective walls 24 or 25, rather than the end wall 26.

In considering the operation of the depicted embodiment of the present invention, assume that one or more sources of illumination 14 are directing light toward the reflective surface 12 and an item 13 positioned thereon to be photographed, along with a particular pattern of digital information displayed on the digital matrix 20, by the camera 15. If the particular digital code for the item being photographed calls for the digital element corresponding to the aperture 22 to be black, the lamp 26 is not illuminated. Illumination entering the aperture 22 from the sources 14 is trapped in the chamber 23 due to the nonreflective qualities of that chamber, and so the area of the aperture 22 is photographed as a black area contrasted with the bright background presented by the reflective surface 12, which may be provided with a suitable white reflective coating to enhance the black-white contrast. If the digital element corresponding to the aperture 22 is required to be white instead of black, the lamp 28 is illuminated by supplying power from a suitable source. The illumination from the lamp 28 passes through the end wall 26 separating the lamp chamber 27 from the chamber 23 and then passes through the aperture 22 outwardly toward the lens of the camera 15. The illumination passing through the end wall 26 and the aperture 22 is seen by the camera along with illumination reflected from the surface 12, and the illumination emanating from the aperture 22 is substantially indistinguishable from the illumination reflected from the surface 12 back toward the camera lens. The digital element represented by the aperture 22 thus is photographed by the camera as a "white" element, i.e., an element at the opposite end of the illumination scale from the black element which would be present if the lamp 28 were not illuminated.

The lamp 28 and the other such lamps corresponding to the other elements of the digital matrix can be turned on and off by any suitable device or technique to provide the digital code which is required for a particular photographed item. An individual electrical switch for each of the lamps can be provided, for example, so that the operator can set up the desired digital code by manipulating the switches corresponding to the various digital elements. This method of operation may be cumbersome, however, and it is within the ability of one of ordinary skill in the art to operate the various digital element lamps under the control of input data contained on punched cards, magnetic tape, perforated tape, or the like, on which the data corresponding to the digital code to be used with the items being photographed has been previously stored.

It should be understood, of course, that the foregoing relates to only a preferred embodiment of the invention and that numerous modifications or alternations may be made therein without departing from the spirit and the scope of the invention as set forth in the appended claims.

What is claimed is:

1. Apparatus for producing a selective optical pattern matrix presentation of coded digital data at a surface having illumination impinging thereon comprising:
said surface having a plurality of apertures defining an optical pattern matrix presenting area on said surface and within the illumination impinging area of said surface,
an individual chamber means in optical communication with each said aperture, each chamber means comprising a nonreflective chamber portion defined by wall members at least some of which are substantially nonreflective to minimize reflection out of said aperture of any surface impinging illumination which enters said aperture, and
illumination means contained in each chamber means within a lamp chamber portion in optical communication with said chamber means nonreflective portion to selectively supply illumination thereto which is visible at said surface through said aperture when said illumination is lit, said selective supply of illumination and lack thereof at said surface for each chamber means enabling the selective optical pattern to be presented at said surface.

2. Apparatus as in claim 1, wherein said surface is substantially reflective of illumination which impinges thereon.

3. Apparatus as in claim 1, wherein said lamp chamber portion is separated from said nonreflective chamber portion by an illumination transmissive member.

4. Apparatus as in claim 3, wherein said nonreflective chamber portion is disposed beneath said surface in optical alignment with said aperture; and
said lamp chamber portion is disposed beneath said nonreflective chamber portion in optical alignment with said aperture.

5. In an apparatus for making a record of data together with a selective pattern matrix of digital code elements and including a reflective surface for receiving data to be recorded along with said digital code matrix, a camera located a distance spaced from the reflective surface and directed toward the reflective surface for record making purposes, and a source of illumination directed toward the surface to illuminate the data, the improvement comprising:
said reflective surface having a plurality of apertures therein at a location corresponding to the matrix of digital code elements to be recorded by the camera from said reflective surface;
each said aperture being in optical communication with an individual chamber means disposed beneath the reflective surface; and
an individual digital code element illumination means in a lamp chamber portion of each chamber means to selectively supply to each said chamber means illumination which is visible to the camera through said aperture;
each said chamber means having a nonreflective chamber portion defined by wall members at least some of which are substantially nonreflective so as to be substantially nonreflective of any said surface directed illumination which enters said chamber means through said aperture so that each said aperture appears to the camera as a dark digital code element in contrast with the reflective surface when said digital code element illumination means for that aperture is inoperative and so that said aperture appears to the camera as a lighted digital code substantially nondiscernible in contrast with the reflective surface when the digital code element illumination means for that aperture is operative to supply illumination to said chamber means.

6. Apparatus as in claim 5, wherein:
said nonreflective chamber portion is disposed beneath said reflective surface in optical alignment with said aperture;

said lamp chamber portion is disposed beneath said nonreflective chamber portion in optical alignment with said aperture; and said nonreflective chamber portion is separated from said lamp chamber portion by an illumination transmissive member.

7. Apparatus as in claim 6, wherein:

said illumination transmissive member is disposed beneath said surface a distance which is sufficient to cause rays of any surface directed illumination and entering said nonreflective chamber portion through said aperture to strike said nonreflective walls and not said illumination transmissive member in at least sufficient measure that said aperture appears to the camera to be without illumination when said digital code element illumination means in said lamp chamber is inoperative.

* * * * *